(12) United States Patent
Clausen (10) Patent No.: US 9,287,928 B2
(45) Date of Patent: Mar. 15, 2016

(54) METHOD AND APPARATUS FOR ADDING A COMMUNICATION CONNECTION TO A VECTORED GROUP

(75) Inventor: Axel Clausen, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 2028 days.

(21) Appl. No.: 12/109,109

(22) Filed: Apr. 24, 2008

(65) Prior Publication Data

US 2009/0270038 A1    Oct. 29, 2009

(51) Int. Cl.
*H04M 17/00* (2006.01)
*H04B 3/32* (2006.01)
*H04M 11/06* (2006.01)

(52) U.S. Cl.
CPC ............. *H04B 3/32* (2013.01); *H04M 11/062* (2013.01)

(58) Field of Classification Search
CPC .......... H04B 3/32; H04B 3/487; H04B 3/464; H04B 17/00; H04B 1/7075; H04B 3/28; H04B 3/46; H04B 3/50; H04B 15/00; H04B 1/10; H04B 1/1027; H04B 1/401; H04B 1/62; H04B 3/06; H04B 7/005; H04B 7/0417; H04B 7/0634; H04B 7/0647; H04B 7/08; H04B 1/0475; H04B 1/12; H04B 1/109; H04B 1/30; H04M 1/74; H04W 16/14
USPC .................. 379/416, 417; 370/201; 455/63.1, 455/114.2, 278.1, 295, 296
See application file for complete search history.

(56) References Cited

U.S. PATENT DOCUMENTS

| | | | |
|---|---|---|---|
| 6,987,800 B2 | 1/2006 | Nordstrom et al. | |
| 7,023,908 B2 | 4/2006 | Nordstrom et al. | |
| 7,817,745 B2 | 10/2010 | Cioffi et al. | |
| 2003/0031103 A1* | 2/2003 | Kuribayashi et al. | 369/47.17 |
| 2003/0086362 A1 | 5/2003 | Hasegawa et al. | |
| 2004/0157566 A1 | 8/2004 | Fishman | |
| 2006/0029147 A1 | 2/2006 | Tsatsanis | |
| 2006/0274893 A1* | 12/2006 | Cioffi | H04B 3/487 379/399.01 |
| 2007/0047631 A1 | 3/2007 | Bostoen et al. | |
| 2007/0133723 A1 | 6/2007 | Cheong et al. | |
| 2008/0089433 A1 | 4/2008 | Cho et al. | |
| 2009/0046568 A1* | 2/2009 | Xu | H04L 25/03343 370/201 |
| 2009/0116582 A1 | 5/2009 | Ashikhmin et al. | |
| 2009/0296865 A1 | 12/2009 | Ashikhmin et al. | |

FOREIGN PATENT DOCUMENTS

WO    2009058306 A1    5/2009

OTHER PUBLICATIONS

Cendrillon, R. et al. "The Linear Zero-Forcing Crosstalk Canceler is Near-Optimal in DSL Channels." IEEE Global Telecommunications Conference, 2004 (Globecom '04). vol. 4, Nov. 29-Dec. 3, 2004, pp. 2334-2338.

Duvaut, P. et al. "Adaptive Off-Diagonal MIMO Pre-coder (ODMP) for Downstream DSL Self FEXT Cancellation." IEEE Global Telecommunications Conference, 2007 (Globecom '07). Nov. 26-30, 2007, pp. 2910-2915.

(Continued)

*Primary Examiner* — Akelaw Teshale (57) ABSTRACT

Methods for adding a communication connection to a vectored group of communication connections and corresponding apparatuses are disclosed.

27 Claims, 6 Drawing Sheets

(56) References Cited

OTHER PUBLICATIONS

Leshem, A. et al. "A Low Complexity Coordinated FEXT Cancellation for VDSL." Proceedings of the 2004 11th IEEE International Conference on Electronics, Circuits and Systems, 2004 (ICECS 2004). Dec. 13-15, 2004, pp. 338-341.

Author Unknown. "Dynamic Spectrum Management for Digital Subscriber Lines—Edition 2." Alcatel Technology White Paper. Available at: http://whitepapers.zdnet.com/abstract.aspx?docid=151919.

ITU-T (International Telecommunication Union) G.944.1 (Feb. 2007). "Series G: Transmission Systems and Media, Digital Systems and Networks, Digital Sections and Digital Line System—Access Networks, Handshake Procedures for Digital Subscriber Line (DSL) Transceivers."

ITU-T (International Telecommunication Union) G.993.2 (Feb. 2006). "Series G: Transmission Systems and Media, Digital Systems and Networks, Digital Sections and Digital Line System—Access Networks, Very High Speed Digital Subscriber Line Transceivers 2 (VDSL2)."

ITU-Telecommunication Standardization Sector. Temporary Document GB-058R1. "G.PLOAM, G.ADSL, G.VDSL—Overview of Technologies for Vectored DSL." Jun. 12-16, 2006.

ITU-Telecommunication Standardizatin Sector. Temporary Document NC-028. "G.vdsl: Answers to Questions and Concerns Related to Reporting the Error (f) for Self FEXT Cancellation." Apr. 16-20, 2007.

ITU-Telecommunication Standardization Sector. Temporary Document 08CS-067. "G.vector: Fast Seamless Joining via CPE Correlation of Joining Signature Sequence." Apr. 7-11, 2008.

ITU-Telecommunication Standardization Sector. COM 15-C 177-E. "G.vdsl2: Pilot Sequence Assisted Vector Channel Estimation." Oct. 2006.

ITU-T SG15. Temporary Document 267-WP1. "G.vector: Draft text for Recommendation G.vector." Feb. 11-22, 2008.

NIPP-NAI-2007-023. ATIS Network Interface, Power & Protection Committee (NIPP), Subcommittee Network Access Interfaces (NAI). "Implementation of the 'Abuse of Receivers' Method of FEXT Cancellation." Feb. 12-15, 2007.

NIPP-NAI-20074-013R4. "Second Letter Ballot Draft of the DSM Technical Report." Feb. 12-15, 2007.

"Very high speed digital subscriber line transceivers2 (VDSL2)." Norm ITU-T G.993.2. 2007. pp. 1-252. ITU, Switzerland.

\* cited by examiner

METHOD AND APPARATUS FOR ADDING A COMMUNICATION CONNECTION TO A VECTORED GROUP

BACKGROUND

So-called vectoring or vectored data transmission is a technique for coordinated transmission or reception of data from a plurality of transmitters to a plurality of receivers via a plurality of communication connections in order to improve the transmission, for example to reduce the influence of crosstalk. Either transmitters or receivers are co-located.

For example, in DSL (digital subscriber line) transmission systems, for example VDSL (very high bit rate DSL) transmission systems, data may be transmitted from a central office (CO) or other provider equipment to a plurality of receivers located in different locations, for example in customer premises (CPE), via a plurality of communication lines. Crosstalk resulting from signals on different lines transmitted in the same direction, also referred to as far end crosstalk (FEXT), may result in a reduced data throughput. Through vectoring, signals transmitted over the plurality of communication lines from the central office or received via the plurality of communication lines in the central office may be processed jointly in order to reduce such crosstalk, which joint processing corresponds to the above-mentioned vectoring. In this respect, the reduction of crosstalk by coordinated transmission of signals is sometimes referred to as crosstalk precompensation, whereas the reduction of crosstalk through joint processing of the received signals is sometimes referred to as crosstalk cancellation. The communication connections which are processed jointly are sometimes referred to as vectored group.

Both at the initialization of communication and during communication, it may be necessary to add an additional communication connection to the vectored group, for example when an additional user of a DSL service becomes active. In such a case, it is generally desirable to minimize the influence of this joining of a new communication connection on the data transmission occurring in the communication connections already in the vectored group.

SUMMARY

In an embodiment, a method is provided, said method comprising:
a first adapting phase wherein vectoring is adapted to reduce crosstalk from a communication connection to be added to the vectored group to at least one communication connection of the vectored group,
after said first adapting phase, an initialization phase wherein data transmission on said communication connection to be added to the vectored group is at least partially initialized, and
after said initialization phase, a second adapting phase wherein the vectoring is adapted to reduce crosstalk from at least one communication connection of the vectored group to the communication connection to be added to the vectored group.

The above summary is merely intended to give a brief overview of some features of some embodiments of the present invention, and other embodiments may comprise additional and/or different features than the ones mentioned above. In particular, this summary is not construed to be limiting the scope of the present application.

DETAILED DESCRIPTION OF THE INVENTION

In the following, some embodiments of the present invention will be described in detail. It is to be understood that the following description is given only for the purpose of illustration and is not to be taken in a limiting sense. The scope of the invention is not intended to be limited by the embodiments described hereinafter with reference to the accompanying drawings, but is to be intended only to be limited by the appended claims and equivalents thereof.

It is also to be understood that in the following description of embodiments any direct connection or coupling between functional blocks, devices, components, circuit elements or other physical or functional units shown in the drawings or described herein could also be implemented by an indirect connection or coupling. Furthermore, it should appreciated that functional blocks or units shown in the drawings may be implemented as separate circuits in embodiments, but may also be fully or partially implemented in a common circuit in other embodiments. It is further to be understood that any connection which is described as being wire-based in the following specification may also be implemented as a wireless communication unless noted to the contrary.

It should be noted that the drawings are provided to give an illustration of some aspects of embodiments of the present invention and therefore are to be regarded as schematic only. In particular, the elements shown in the drawings are not necessary to scale with each other, and the placement of various elements in the drawings is chosen to provide a clear understanding of the respective embodiment and is not to be construed as necessarily being a representation of the actual relative locations of the various components in implementations according to an embodiment of the invention.

The features of the various embodiments described herein may be combined with each other unless specifically noted otherwise.

The term "communication connection" as used herein is intended to refer to any kind of communication connection including wire-based communication connections and wireless communication connections.

Figure 1:
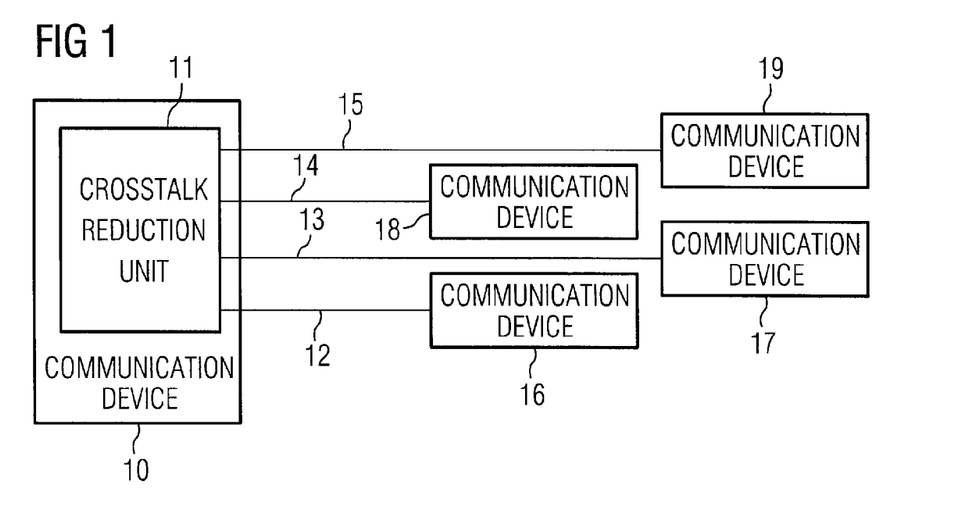
FIG. 1 shows a communication system according to an embodiment of the present invention.

In FIG. 1, a communication system according to an embodiment of the present invention is schematically shown.

In the communication system of FIG. 1, a communication device 10 communicates with communication devices 16, 17, 18 and 19 via respective communication connections 12, 13, 14 and 15. While in FIG. 1 four communication devices 16, 17, 18 and 19 are shown, in other embodiments any suitable other number of communication devices may also be provided.

In an embodiment, the communication via communication connections 12, 13, 14 and 15 is a bidirectional communication. In such an embodiment, communication device 10 may comprise a transceiver for each of the communication connections 12, 13, 14 and 15, and each communication device 16, 17, 18 and 19 also may comprise a transceiver. In another embodiment, all or some of communication connections 12, 13, 14 and 15 may be unidirectional communication connections. In another embodiment, all or some of the communication devices 16, 17, 18, 19 might be co-located.

In the embodiment of FIG. 1, couplings between the communication connections 12-15 may cause crosstalk, for example if some or all of the communication connections are wire lines running close to each other. Through at least partial joint processing of the signals transmitted from communication device 10 to communication device 16, 17, 18 and 19 and through at least partial joint processing of signals received from communication devices 16, 17, 18 and 19 at communication device 10 in a crosstalk reduction unit 11, the influence of such crosstalk may be reduced. As already mentioned, the joint processing for crosstalk reduction is also referred to as vectoring, and the communication connections which are subjected to such a crosstalk reduction are also referred to as vectored group.

In the following, the transmission direction from communication device 10 to communication devices 16, 17, 18 and 19 will be referred to as downstream direction, and the opposite transmission direction from communication devices 16, 17, 18 and 19 to communication device 10 will be referred to as upstream direction. Reduction of crosstalk in the downstream direction is also referred to as crosstalk precompensation since the signals transmitted are modified before transmission, i.e. before the actual crosstalk occurs, whereas the reduction of crosstalk in the upstream direction is also referred to as crosstalk cancellation as here through joint processing in crosstalk reduction unit 11 the crosstalk is reduced or cancelled after it has occurred.

In embodiments, crosstalk cancellation may for example be performed by calculating received signals for each communication connection depending on a linear combination of all received signals on all communication connections of the vectored group, and crosstalk precompensation may be performed by calculating signals to be transmitted via each communication connection depending on a linear combination of signals to be transmitted on all communication connections. However, other calculation methods, for example non-linear calculations, are also possible.

In order to perform this crosstalk reduction, i.e. the vectoring, the crosstalk reduction unit 11 has to be "trained", i.e. the crosstalk reduction unit 11 needs information regarding the actual crosstalk occurring between the communication connections in the vectored group. This may for example be achieved by transmitting predetermined training signals, for example pilot signals, via the communication connections and analyzing the received signals to determine the crosstalk. In embodiments, data transmission via the communication connections comprises the transmission of pilot signals or symbols, wherein between the pilot signals other data like payload data may be transmitted. In an embodiment, the pilot signals or modified pilot signals are used for training crosstalk reduction unit 11. In an embodiment, synchronization signals or synchronization symbols may be used as pilot signals.

In a communication system like the one shown in FIG. 1, the situation may occur that a communication connection is to be added to the vectored group. For example, in the embodiment of FIG. 1 initially only communication connections 12, 13 and 14 may be included in the vectored group, while communication connection 15 may be inactive (for example communication device 19 may be switched off) and therefore not be added to the vectored group. When communication device 19 becomes active, in order to also reduce the crosstalk between communication connection 15 and communication connections 12-14 which already are incorporated in the vectored group, communication connection 15 is to be added to the vectored group. For such an additional communication connection to be added, crosstalk reduction unit 11 has to be trained and adapted accordingly.

In an embodiment, for adding an additional communication connection (like communication connection 15 in the above example) to a vectored group, a first vector training is performed to reduce or cancel the crosstalk resulting from the influence of the communication connection to be added, hereinafter also referred to as the joining connection, to the communication connections already in the vectored group. When this first vector training is completed, the influence of data transmitted over the joining connection on the data transmission of the connections already in the vectored group is minimized or at least reduced by an adaptation of the crosstalk reduction coefficients of the connections already in the vectored group in crosstalk reduction unit 11 of the embodiment of FIG. 1. In an embodiment, after this first training, the joining communication connection is at least partially initialized, which may involve for example training steps like obtaining a synchronization, adapting coefficients of receivers in the involved communication devices, for example coefficients for a frequency equalization, adjusting the gain of an amplifier and other training of parameters or exchange of configuration parameters. This initialization of the communication connection may in an embodiment partially overlap with the above-mentioned first vector training. Training steps in the initialization of the joining line may comprise a training for parameters related solely to the joining communication connection. The training may also consist of or incorporate training sequences similar or identical to training sequences for non-vectorized transmission standards for example the channel discovery training sequence defined in ADSL and VDSL. In general, in the context of the present application initialization refers to any measure taken for establishing and setting up communication via a connection before transmission of payload data starts. As mentioned above, after the first training the joining communication connection is at least partially initialized, meaning that not all measures, steps and the like for initialization have to be performed at this point, but parts of the initialization may be performed earlier or later. In another embodiment, the complete initialization of the joining line may be performed at this point.

After this at least partial initialization of the joining communication connection, in the currently discussed embodiment a second vector training is performed to adapt the vectoring to reduce or cancel crosstalk resulting from the influence of the communication connections of the vectored group to the joining communication connection. With the order of the training and initialization phases of the embodiment described above, the at least partial initialization of the joining communication connections does not influence data transmission of the communication connections already in the vectored group since the vectoring has been adapted in the first vector training to reduce the crosstalk from the joining communication connection to the communication connections of the vectored group. On the other hand, the second vector training is performed after the above described at least partial initialization of the joining communication connection allowing any modifications to the data transmission on the joining communication connection performed during the initialization of the joining communication connection to be taken into account in the second vector training. This may for example increase the data rate at which the joining line can transmit during at the second vector training. In an embodiment, in the second vector training also the reduction of crosstalk from the joining connections to the communication connections of the vectored group may be re-trained.

In an embodiment, an apparatus like communication device 16, 17, 18 or 19 may be configured to receive vector training signals during the first vector training mentioned above. The apparatus may be further configured to, during the at least partial initialization mentioned above receive and/or transmit initialization signals and to adapt itself to establish communication according to the initialization signals, and configured to transmit vector training signals during the second vector training mentioned above.

In one embodiment, which may be combined with the aforementioned embodiments, but also used separately, the vector training is generally performed using modified non-payload data carrying signals like pilot symbols or pilot signals as mentioned above. For example, synchronization symbols used in a standardized communication method like VDSL to synchronize super frames may be multiplied with sequences of +1 and −1, the sequences of the different channels being chosen such that they are orthogonal to form pilot symbols. For example, Walsh-Hadamard sequences may be used as the modulation sequence.

In such an embodiment, a first vector training to reduce crosstalk from the joining communication connection to the communication connections in the vectored group in the downstream direction is performed, wherein between modulated synchronization signals so-called quiet signals, i.e. when no power or signals with very low transmission power, or signals where only one or more pilot carriers are active (also referred to as carrier-pilot signals), are transmitted. The modulated synchronization signals in the downstream direction are synchronized with synchronization signals transmitted in the communication connections already in the vectored group in the downstream direction. By doing so the transmission of the modulated synchronization signals which are used for the vector training of the cross coupling coefficients does not disturb the actual data transmission on the communication connections in the vectored group since the data transmission on the communication connections in the vector takes place in the time slots between the synchronization signals and since the joining line is synchronized for downstream transmission with the vectored group. The joining line will transmit in these time slots the quiet signals. Therefore, the system is allowed to start right at the beginning of the joining procedure without the need for waiting for initialization steps such as training or exchange of configuration parameters of the joining line or synchronization at the far end device 19 of the joining line since in the vector training in the downstream direction the training signals on the joining line and the data communication signals on the existing line already in the vector group are transmitted from a same device i.e. the communication device 10 which is able to establish synchronization in downstream direction with the communication connections already in the vector group. At this point, the communication device receiving the modulated synchronization signals used for the vector training, in the example given above communication device 19 receiving the signals via communication connection 15 from communication device 10, has not obtained the synchronization timing of transmitted synchronization signals. After the vector training of the communication connections already in the vector group in the downstream direction using the synchronization signals transmitted described above, further training signals are transmitted in the downstream direction allowing the receiving communication device to recover, i.e. obtain, the timing of the synchronization signals. After the timing has been recovered, the communication device may then in an embodiment transmit synchronization signals in the upstream direction synchronized with the synchronization signals sent in the upstream direction on the communication connections already in the vectored group for vector training in the upstream direction.

In another embodiment, the synchronization of the communication device receiving signals in the downstream direction may be obtained at least partially based on the synchronization signals sent during the above-mentioned downstream vector training phase.

The above-mentioned downstream- and upstream training phases may for example be used in the first vector training step described in the previously discussed embodiment.

It should be noted that the embodiments for adding a communication connection to a vectored group of communication connections described herein may be used both as startup of the whole system for adding one communication connection after the other to the vectored group and, when after the initial set up of the system an additional communication connection is to be added to the vectored group.

In the following, further embodiments of the present invention will be described with reference to FIGS. 2-7 using VDSL2 transmission as an example. VDSL2 is a standard described in ITU-T recommendation G.993.2. However, it should be noted that the embodiments described in the following may also be applied to other types of communication than VDSL2 communication, like other types of DSL communication or wireless communication.

In an embodiment using VDSL2 communication, a communication system corresponding to the one already described with reference to FIG. 1 may be used. In this case, communication connections 12-15 are VDSL communication lines, and the communication devices are VDSL communication devices. In such a system, communication device 10 may be part of so-called central office (CO) equipment, for example equipment of a provider of the VDSL service, whereas communication devices 16-19 may be located in customer premises (CPE).

Figure 2:
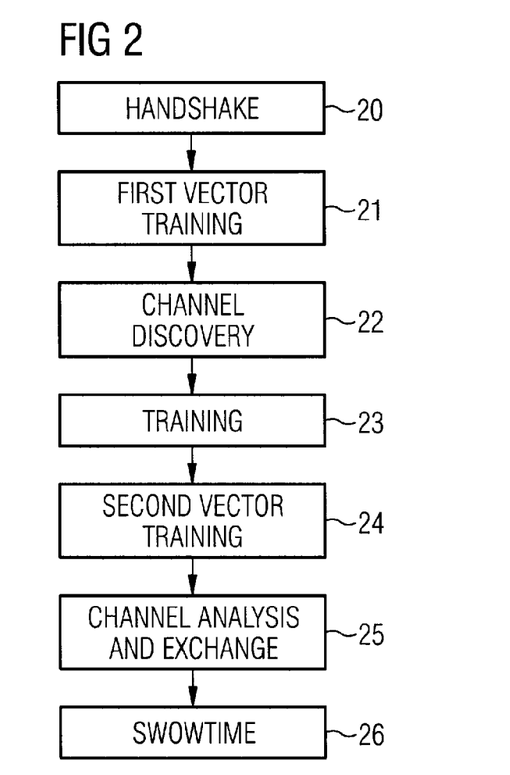
FIG. 2 shows a flow diagram of a method according to an embodiment of the present invention.

In FIG. 2, a flow diagram of a method for adding a communication line (referred to as joining line hereinafter) to a vectored group of communication lines e.g. in a VDSL2 system according to an embodiment of the present invention is shown.

In phase 20 of the embodiment of FIG. 2 a so-called handshake (ITU-T recommendation G. 994.1) is performed on the joining communication line. The handshake is a standardized procedure when a communication line becomes active wherein for example a mode of operation of the equipment used is established and the handshake uses only a very reduced number of subcarriers resulting avoiding influences on the existing communication lines.

In phase 21, a first vector training is performed. In this first vector training, the effect of crosstalk from the joining line to the lines already in the vectored group is reduced. Taking the system of FIG. 1 as an example, when it is assumed then that the communication lines 12-14 are already in the vectored group and communication line 15 becomes active and is to be added to the vectored group, in the first vector training of phase 21 the effects of crosstalk from communication line 15 to communication lines 12-14 is reduced by adapting the operation of crosstalk reduction unit 11 accordingly.

After phase 21, in phase 22 a channel discovery for the joining communication line is performed, and in phase 23 a training is performed for further adapting various parameters in the receivers receiving data transmission via the communication line to be added. In the example given above with respect to FIG. 1, for example the receiver in communication device 19 and the receiver in communication device 10 coupled to communication line 15 are trained. In VDSL2 data transmission, channel discovery and training are standardized steps of an initialization phase. In other communication modes, similar steps may be standardized. Since in the first vector training step 21 of this embodiment the crosstalk from the joining line to the lines already in the vectored group has been reduced, phases 22 and 23 which involve transmitting signals including data over the joining communication line do not or do not significantly influence data transmission on the communication lines already in the vectored group.

It should be noted that in an embodiment phases 21 and 22 may be at least partially combined, i.e. the channel discovery may be performed fully or partially during or interleaved with the first vector training. According to one embodiment, the first vector training is timely split for the upstream and downstream transmission such that the downstream is performed prior to the upstream training. In such an embodiment, phase 22 may already be started for the downstream direction while the upstream direction is still performing phase 21. The above allows to partially combine the channel discovery of existing standards into a vectored system while allowing a start of the vector training at a very early point of time in the joining procedure.

In an embodiment, in phases 22 and 23 a so-called back channel is established in the joining communication line over which in response to signals in the downstream direction messages may be sent back to the communication device transmitting the signals in the downstream direction, e.g. to the central office, for example to give information about receiving errors and the like. Taking again FIG. 1 as an example, such a back channel may be used to transmit status messages, information messages and the like from communication device 19 to communication device 10.

Following phase 23, in phase 24 a second vector training is performed, in which the vectoring is adapted to reduce crosstalk from the communication lines already in the vectored group to the joining communication line. In an embodiment, the second vector training may also involve adjusting the crosstalk related parameters determined during the first vector training to adapt to changes in the communication over the joining line caused by phases 22 and 23.

In phase 25, a so-called channel analysis and exchange is performed, which again is a step standardized for example in VDSL communication.

Finally, in phase 26 so-called "showtime" begins, i.e. the joining communication line now has joined the vectored group and is used for transmission of payload data.

Phases 22, 23 and 25 according to VDSL2 are parts of the so-called initialization of the joining communication line. In the embodiment of FIG. 2 therefore the initialization is at least partially performed between the first vector training of phase 21 and the second vector training of phase 24, another part of the initialization, namely the channel analysis and exchange, being performed after the second vector training of phase 24. In another embodiment, the complete initialization may be performed between the first vector training of phase 21 and the second vector training of phase 24.

In an embodiment, for the first vector training and the second vector training mentioned above so-called synchronization symbols (SyncSymbols) of VDSL2 are used as pilot symbols. For example, in VDSL2 system, a synchronization symbol is sent every $257^{th}$ symbol. These synchronization symbols may be modified to form sequences of synchronization symbols for each time, wherein the sequences in each of the communication lines involved are orthogonal to each other. For example, the SyncSymbols may be multiplied with predetermined series of −1 and +1, the sequences corresponding to Walsh-Hadamard sequences of a predetermined length, for example a length of 64 symbols. However, other types of orthogonal or almost orthogonal sequences may be used as well in an embodiment.

In the following, the first vector training and the second vector training according to embodiments of the present invention will be discussed in greater detail.

Figure 3:
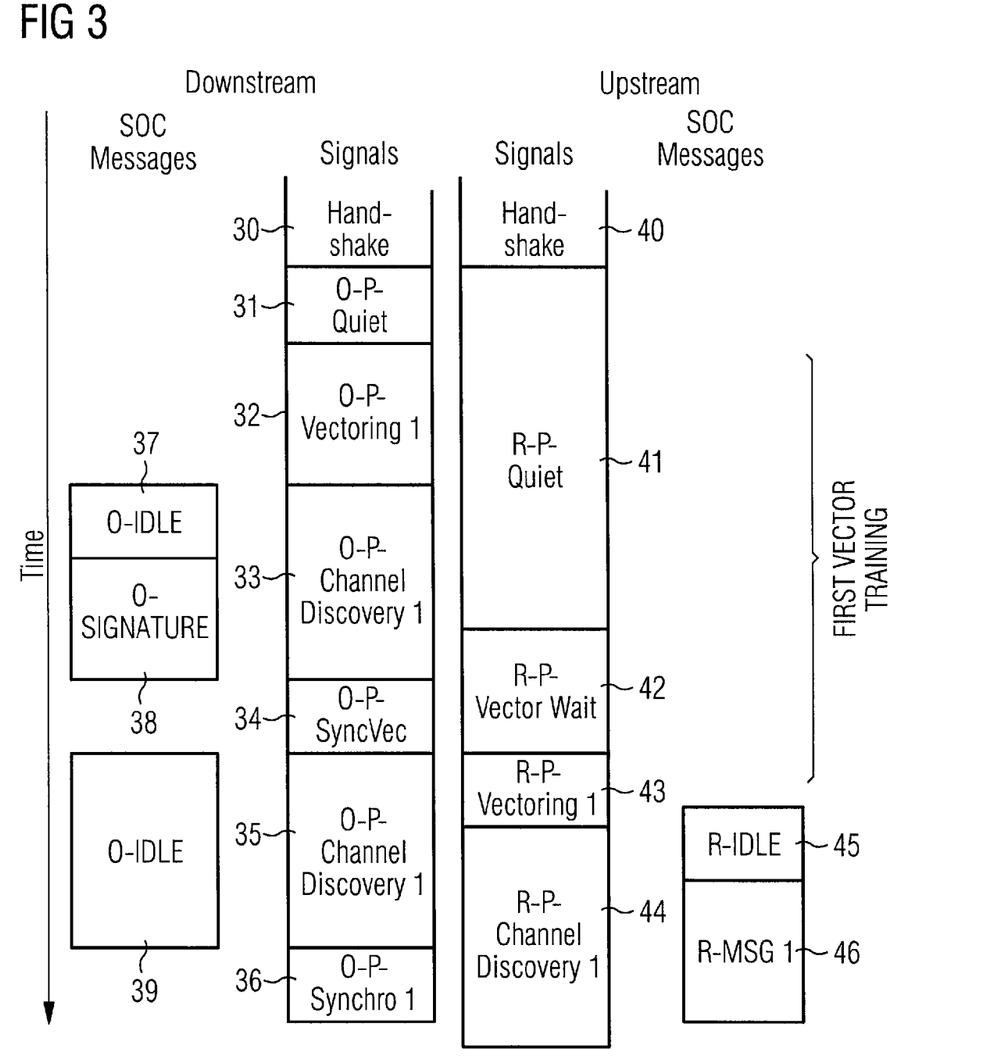
FIG. 3 shows a timing diagram of an embodiment of the present invention.
Figure 4:
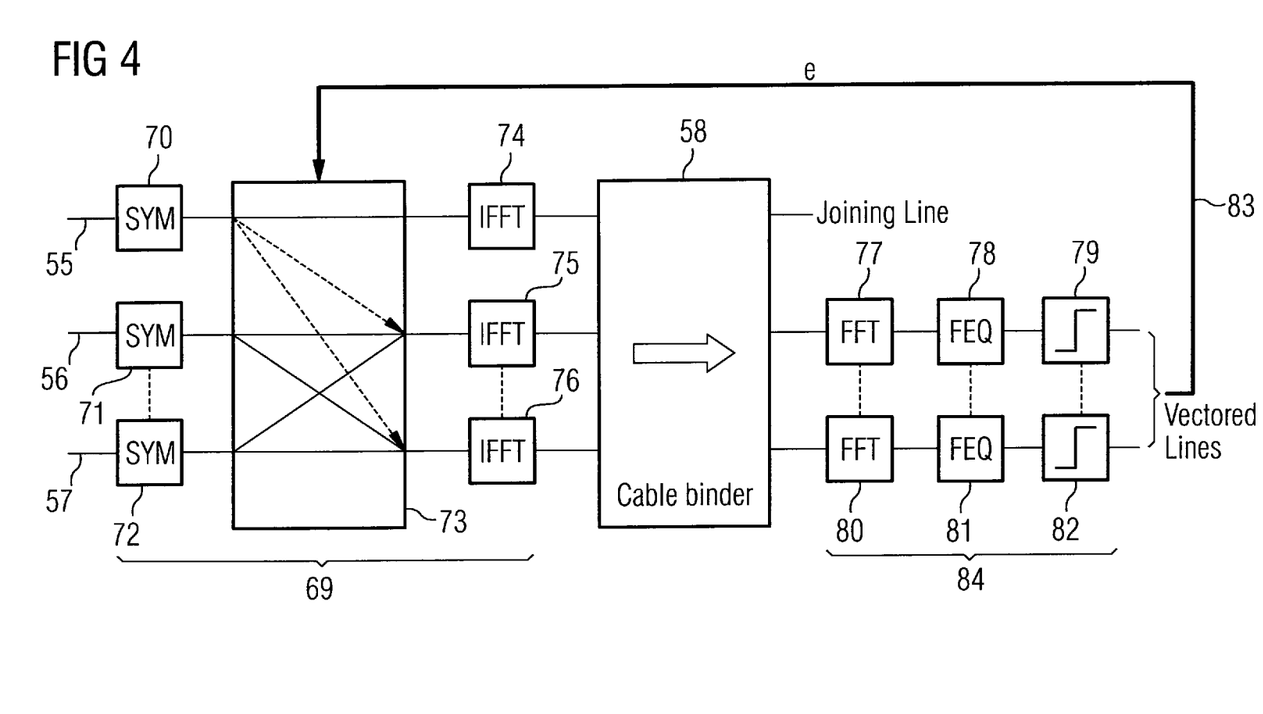
FIG. 4 shows a block diagram of a communication system according to an embodiment of the present invention.
Figure 5:
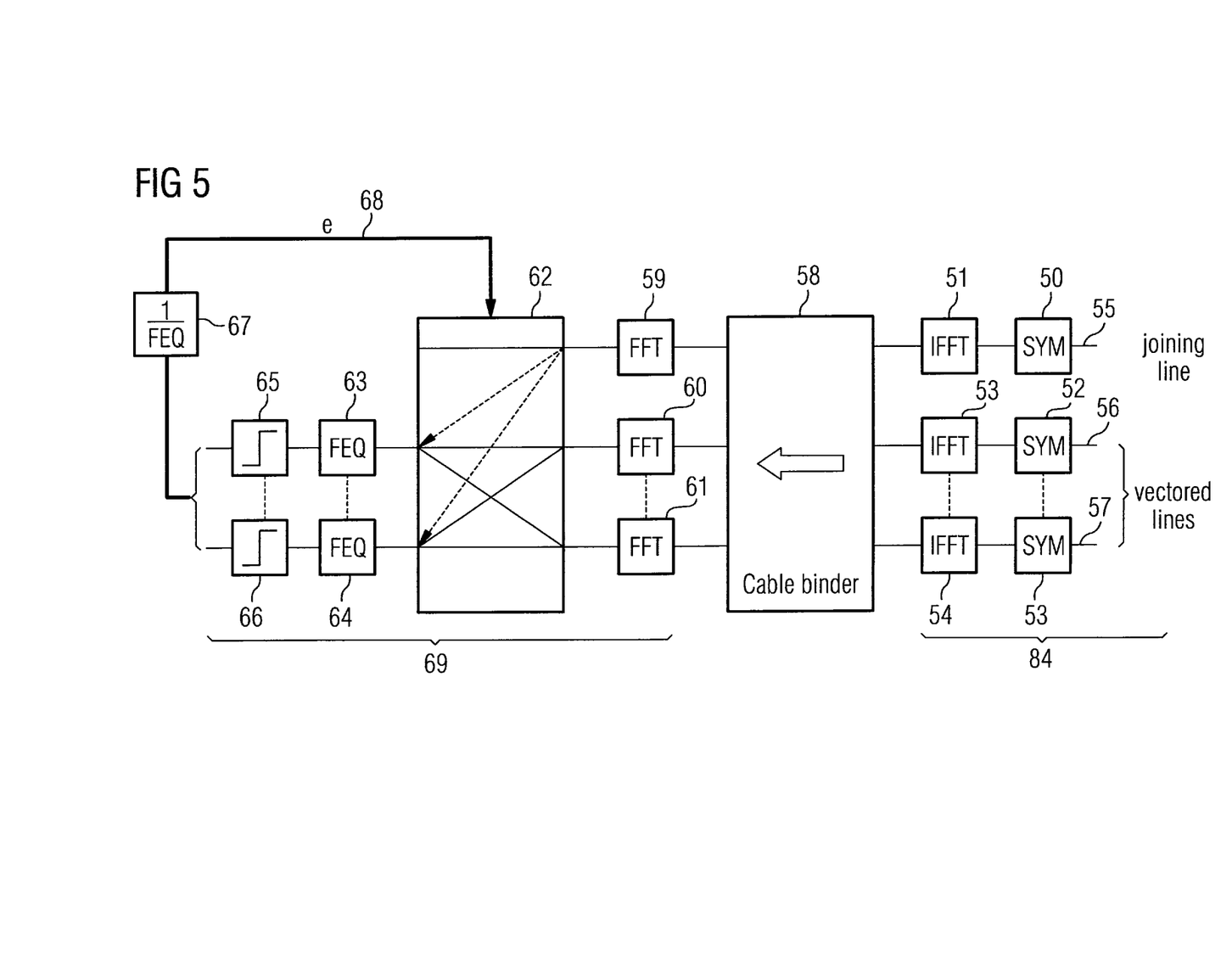
FIG. 5 shows a block diagram of the communication system of FIG. 4 operated in a different transmission direction, FIG. 6 schematically depicts data transmission according to an embodiment of the present invention, and FIG. 7 schematically depicts data transmission according to another embodiment of the present invention.
Figure 6:
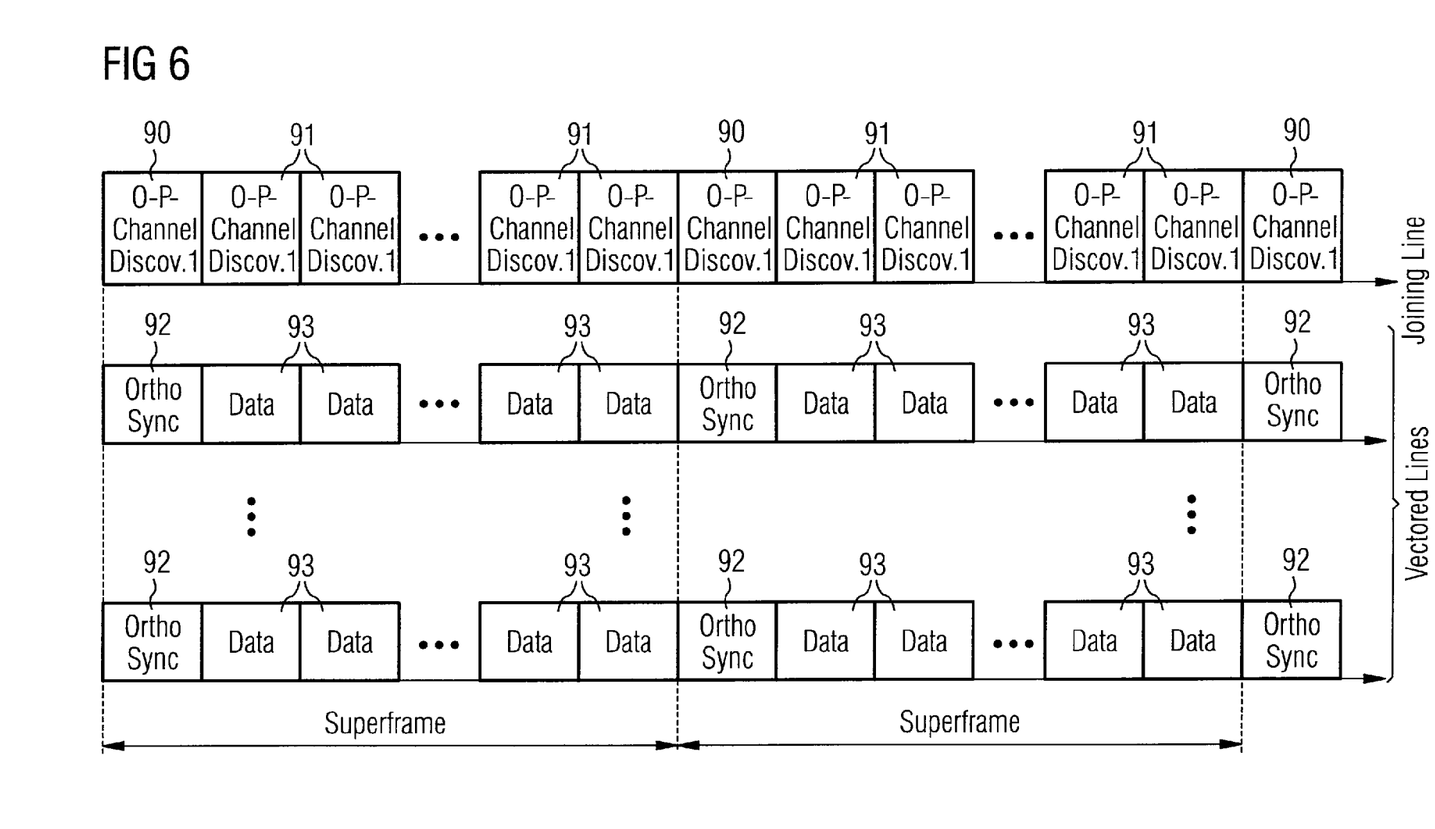

In this respect, FIG. 3 shows a detailed timing diagram of different phases of signal transmission via a joining communication line comprising signals transmitted during the first vector training according to an embodiment, FIGS. 4 and 5 show exemplary diagrams of communication systems during training in the downstream direction and training in the upstream direction, respectively, and FIG. 6 shows a diagram showing signals transmitted for recovering a synchronization timing at a receiver.

In FIG. 3, the phases of signal transmission are schematically ordered in four columns. The two left columns relate to signals and messages transmitted in the downstream direction, and the two columns to the right relate to signals and messages transmitted in the upstream direction. In each transmission direction, a discrimination is made between messages sent on the so-called special operations channel (SOC) which is specified according to VDSL2 standard (shown in the left-most and rightmost column) and other signals transmitted (shown in the two middle columns). For these special operations channels, an HDLC (High Level Data Link Control) like protocol may be used.

The data transmission both in the downstream direction and in the upstream direction starts with the signals necessary for the handshake, denoted with reference numeral 30 in the downstream direction and 40 in the upstream direction. In the downstream direction, after the signals necessary for the handshake have been transmitted, at 31a phase where so-called quiet symbols are transmitted follows denoted with reference numeral 31. Quiet symbols are signals having no or very little transmit power, for example generated by modulating only zeros on carriers used for VDSL transmission. After phase 31, a phase 32 labeled O-P-Vectoring 1 is initiated. During this phase, the crosstalk from the joining communication line to the communication lines already in the vectored group in the downstream direction is reduced. It should be noted that phase 31 in a different embodiment may also be omitted, such that phase 32 immediately follows the handshake signals sent in phase 30. Phase 32, i.e. the phase labeled O-P-Vectoring 1, will be explained in more detail with reference to FIG. 4.

In FIG. 4, a communication system according to an embodiment of the present invention is shown transmitting data in the downstream direction. In the system shown in FIG. 4, data is transmitted from a central office 69 via a plurality of communication lines 55, 56, 57 to a plurality of receivers in customer premises generally labeled 84. In the system of FIG. 4, the communication lines are joined in a so-called cable binder 58. Communication lines in a cable binder are usually located comparatively close to each other and are therefore prone to crosstalk. In the system shown in FIG. 4, communication lines 56 and 57 as well as further (not shown) communication line indicated by dotted lines are already incorporated in the vectored group. It should be noted that the number of communication lines in the vectored group is not limited to any particular number. Communication line 55 in the example shown is the joining line, i.e. is to be added to the vectored group.

In the system of FIG. 4, a symbol mapper denoted with reference numerals 70, 71 and 72 maps data, e.g. payload or training data, onto carrier constellations which are to be transmitted via communication lines 55, 56 and 57, respectively. A crosstalk precompensator 73 modifies these symbol mappings in order to precompensate crosstalk occurring during the transmission. The such modified carrier mappings are modulated onto a plurality of carriers for each communication line, said carriers having different frequencies, and are then transferred into signals in the time domain by inverse fast Fourier transformations 74, 75 and 76, respectively. This type of modulation, also referred to as discrete multitone modulation (DMT) is commonly used in DSL systems like VDSL systems or VDSL2 systems. The such generated signals are then transmitted via the communication line to the customer premises. The received signals are then converted into the frequency domain by fast Fourier transformers 77 and 80, respectively and equalized by frequency equalizers 78, 81, respectively before slicers 79 and 82, respectively output received constellations which, in case of an error-free transmission, correspond to input constellations generated in 71, 72 originally intended for transmission. It should be noted that also a customer premises equipment of the joining lines may have elements corresponding to the elements shown for the vectored lines like fast Fourier transformer, frequency equalizer and slicer, but these are not shown in FIG. 4. Moreover, it is to be understood that for clarity's sake only some elements of the communication devices involved are shown, and further devices like amplifiers, sampling units and the like may be present.

During the O-P-Vectoring 1 of phase 32 of FIG. 3, crosstalk from the joining line 55 to the lines already in the vectored group like lines 56 and 57 is to be reduced, the crosstalk being indicated in FIG. 4 by dashed arrows in crosstalk precompensator 73.

As already mentioned, for adapting the vectoring which is implemented in this case by crosstalk precompensator 73 to the joining line, synchronization symbols transmitted are modified to form orthogonal pilot sequences. The synchronization symbols on all the lines are sent in a synchronized manner, i.e. at the same time. Since in the downstream direction these signals are sent by central office 69, at this stage it is not necessary that the corresponding receiver connected to the joining line in the customer premises has obtained this synchronization, i.e. it is not necessary that the receiver at this stage is already adapted to the synchronization timing.

In an embodiment, a specific sequence is reserved for joining lines. For example, using the Walsh-Hadamard sequences multiplying the synchronization symbols with sequences of +1 and −1 described above, a sequence consisting only of +1 values or of alternating +1 and −1 values may be reserved for joining lines.

On the joining line, in the embodiment of FIG. 3, during the O-P-Vectoring 1 phase quiet symbols or carrier-pilot symbols which only relate to one or a few carriers are transmitted between the synchronization symbols. Therefore, through crosstalk the data transmission occurring in the vectored lines already in the vectored group between the synchronization symbols is not or is not significantly disturbed and can continue during this phase.

Via respective backchannels in the vectored lines, an error signal e is transmitted back to crosstalk precoder 73. Error signal e for the synchronization symbols is indicative of a difference between the synchronization symbols sent (which are known to the receiver since fixed sequences are used) and the symbols actually received. Based on this error signal, the crosstalk precompensator 73 is adapted to reduce the error, i.e. the difference between symbols sent and symbols received, by reducing the effect of crosstalk from the joining line to the vectored line. Therefore, after the phase O-P-Vectoring 1 of FIG. 3 has been completed, the effect of crosstalk from the joining line to the vectored lines in the downstream direction can been reduced.

After this phase, signals may be transmitted on the joining line in the downstream direction also in-between the synchronization symbols which, because of the crosstalk reduction performed, does not or does not significantly influence the data transmission in the downstream direction on the communication lines already in the vectored group in an embodiment of the present invention.

After phase 32, in the downstream direction symbols for a channel discovery, labeled O-P-channel discovery 1 in FIG. 3, are transmitted at reference numeral 33. Channel discovery itself is an initialization phase which is defined in various communication standards, for example VDSL2 communication. During this phase, channel discovery symbols are sent. In an embodiment, some of these symbols are modified to enable the receiver which is in the system shown in FIG. 4 the customer premises equipment connected to the joining line to obtain a timing synchronization to the synchronization symbols sent, or, in other words, to adjust itself to the timing of the synchronization symbols transmitted. A possible implementation according to an embodiment of the phase 33 will be explained with reference to FIG. 6.

In FIG. 6, the data transmission in downstream direction on the joining line and on the vectored lines, i.e. the lines already in the vector group, is schematically shown. On the vectored lines, VDSL2 data is transmitted in so-called superframes, each superframe comprising 257 DMT symbols. Each superframe starts with a synchronization symbol 92 followed by data symbols 93. With the data symbol, any kind of desired data, in particular payload data, may be transmitted. In the embodiment of FIG. 6, the synchronization symbols as already discussed previously are modulated with predetermined sequences, for example with Walsh-Hadamard sequences of −1 and 1, such that the sequences in the different vectored lines are orthogonal to each other. The sequences may have a predetermined length, for example 64 symbols. On the joining line, symbols 90, 91 for channel discovery are transmitted in downstream direction, wherein the symbols on the joining line are at least approximately transmitted synchronously with the symbols on the vectored lines. In order to enable the receiver at the subscriber end to recover the timing of the synchronization symbols, the symbols 90 which are synchronously sent with the synchronization symbols 92 on the vectored lines are marked such that they can be identified by the receiver. Marking may be a provided by using a modulation scheme different than the modulation scheme used for normal transmission operation. In an embodiment, to mark symbols 90 as being at the position of the synchronization symbols 92, in an embodiment a modulation constellation at a specific carrier, at a particular group of carriers or at all carriers are inverted. For example, in an embodiment the constellations of carriers number 5, 15, 25, 35 . . . may be inverted. In an embodiment, this inversion is performed during the complete initialization process, e.g. up to the start of showtime. In a different embodiment, the inversion is performed only during part of the initialization process. It should be noted that the above-described embodiment of phase 33 for marking the positions of the symbols 90 may be implemented independently from the remaining phases of FIG. 3.

In addition to the channel discovery of phase 33, in the special operation channel in downstream direction at 37 an idle message and at 38 a so-called signature message (O-signature) is transmitted. In conventional DSL systems with this message diverse parameters for transmission may be communicated to the customer premises equipment. The O-signature message may for example provide information regarding a power spectral density (PSD), a transmit power level etc. In an embodiment, this message is used to transmit additional information concerning the vectoring. For example, in an embodiment the O-signature message may comprise information regarding an offset between synchronization symbols between the upstream direction and the downstream direction, i.e. information indicating if and by which amount the synchronization symbols transmitted in the upstream direction in the communication system are offset from the synchronization symbols transmitted in the downstream direction, and/or may comprise information regarding a modulation sequence for the synchronization symbols to be used by the joining line. As indicated previously, for the joining phase a sequence may be reserved for the joining line, for example a sequence of only +1 or a sequence of alternating +1 and −1, whereas after the joining each line uses its own specified sequence. The O-signature message may communicate to the customer premises equipment which sequence is to be used by the particular joining line, for example by comprising an index of a sequence or the sequence itself.

As mentioned, in the channel discovery phase and possibly in a following training phase the equipment on the side of the customer premises set up and trained its receiver, for example performs a sampling rate recovery, a set up of an automatic game control, a set up of the symbol timing recovery, a training of the frequency equalizer etc. Furthermore, through the above-mentioned marking of symbols 90, the customer premises equipment in the currently discussed embodiment recovers or obtains information regarding the location of the synchronization symbol position in the downstream direction. As soon as the position of the synchronization signals in downstream direction has been identified and the O-signature message of phase 38 has been decoded, the customer premises equipment in this embodiment can determine the location of the synchronization symbols in the upstream direction, which may be calculated by the position in the downstream direction and the above-mentioned offset, if any. Until this time, in the upstream direction as indicated by reference numeral 41 only quiet symbols, i.e. only negligible transmit power, are transmitted in the upstream direction in the embodiment of FIG. 3. In another embodiment, carrier-pilot signals may be transmitted during this phase. As soon as the location of the synchronization symbols in downstream direction has been recovered and the O-signature message 38 has been decoded, in phase 42 in the upstream direction labeled R-P-Vector Wait synchronization symbols are transmitted at the defined upstream synchronization symbol positions, i.e. synchronously with the synchronization symbols transmitted on the lines already in the vectored group, and quiet symbols are transmitted between the synchronization signals in the embodiment of FIG. 3. In a different embodiment, carrier-pilot signals may be transmitted between the synchronization signals.

In the embodiment of FIG. 3, since only synchronization symbols are transmitted with quiet symbols in between in phase 42, data transmission in the upstream direction on the lines already in the vector group is not or not significantly disturbed. The symbols transmitted during phase 42 indicates to the central office that the customer premises equipment connected to the joining line has recovered synchronization timing.

In the embodiment of FIG. 3, while the customer premises equipment at this point has recovered the timing of the synchronization symbols in the upstream direction and has been assigned a modulation sequence for modulating its synchronization symbols such that their sequence is orthogonal to the sequences transmitted on the lines already in the vectored group, the customer premises equipment at this point does not know when to start the sequence, i.e. when to use the first element of this sequence. In the embodiment of FIG. 3, the start of the sequence is transmitted to the customer premises equipment with a signal labeled O-P-Sync Vec in phase 34 in downstream direction. In a different embodiment, in phase 33 discussed with reference to FIG. 6 already the start of the sequence may be transmitted, for example by marking the channel discovery symbol 19 which corresponds to the start of sequence in a different manner than the other symbols 90.

In the embodiment of FIG. 3, upon receipt of the O-P-Sync Vec signal, in the upstream direction the phase labeled R-P-Vectoring 1 has started denoted by reference numeral 43. In the phase 43, the vectoring is trained to reduce the crosstalk from the joining line to the lines already in the vectored group in the upstream direction. To this end, during phase 43 in the upstream direction modulated synchronization symbols are transmitted according to the modulation sequence assigned to the respective joining line by O-signature message 38, and quiet symbols or carrier-pilot symbols are transmitted in between the synchronization symbols such that the data transmission on the vectored lines is not disturbed. During phase 42 and/or 43, the already mentioned reserved Walsh-Hadamard sequence or any other sequence reserved for the joining line may be used for modulating the synchronization symbols. The transmission of the synchronization symbols is in synchronization with the transmission on the vectored lines. This adaptation will be explained in some more detail with reference to FIG. 5.

In FIG. 5, some of the components for data transfer in upstream direction of the communication system already discussed with reference to FIG. 4 are shown. On the side of customer premises equipment 84, symbols 50, 52 and 53 are transmitted via the lines, symbol 50 being transmitted via the joining line 55 and symbols 52 and 53 being transmitted via the vectored lines 56, 57. Again it should be noted that while only two vectored lines are depicted, they are intended to represent any arbitrary number of vectored lines. The symbols are modulated onto a plurality of carriers for each line corresponding to the already mentioned DMT modulation according to the VDSL2 standard used and transferred into time domain signals by inverse fast Fourier transformers 51, 53 and 54, respectively. The signals are then transmitted in the upstream direction via the respective lines 55, 56 and 57 which are in cable binder 58 to central office 59. Here, the received signals are sampled and transferred to the frequency domain via fast Fourier transformers 59, 60 and 61.

A crosstalk canceller 62 is used to cancel crosstalk occurring between the lines in cable binder 58. It should be noted that crosstalk canceller 62 may fully or partially be implemented using the same circuit elements as crosstalk precompensator 73, for example by using a common digital signal processor, but also may be implemented using separate elements. Similar to what has already been described for the receiver part of customer premises equipment 84 with reference to FIG. 4, in the receiver part of central office 59 shown in FIG. 5 frequency equalizers 63, 64 followed by slicers 65, 66 are provided to recover received symbols which in case of error free transmission correspond to symbols 52, 53 originally sent.

At this stage, i.e. in phase 43 of FIG. 3, no recovery of the symbols sent via joining line 55 is performed in the embodiment of FIG. 3, although in other embodiment symbols sent via the joining line may be recovered as well. Since the synchronization symbols are predetermined sequences, an error signal e can be calculated describing the difference between the sent synchronization symbols and the symbols actually received for the synchronization symbols. In the embodiment of FIG. 5, with an element 67 the frequency equalization performed in element 63, 64 is reversed, although this is not mandatory for obtaining error signals. Via one or more feedback lines 68, the error signal is provided to crosstalk canceller 62 which adapts the crosstalk cancellation such that the crosstalk, in particular the crosstalk from the joining line to the vectored lines, is reduced. When this training phase 43 is complete, the first vector training 21 of the embodiment of FIG. 2 is completed, i.e. the vectoring has been adapted to reduce crosstalk from the joining lines to the already vectored lines both in the downstream and in the upstream direction.

The phases specifically representing the first vector training in the embodiment of FIG. 3 are phases 32, 34, 42 and 43. Additionally, in phase 33 in the embodiment of FIG. 3 compared with the channel discovery according to conventional VDSL2 standard symbols as a position of synchronization symbols are marked as already explained with reference to FIG. 6.

Following these phases described above, FIG. 3 shows in the downstream direction a phase of channel discovery 1 labeled 35 which is a continuation of phase 33, i.e. phase 33 and 35 together represent the complete channel discovery phase in the downstream direction. Following phase 35, a synchronization phase 36 labeled O-P-synchro 1 is performed which corresponds to a phase defined in the VDSL standard. During this time, an idle message labeled 39 is transmitted in the special operation channel. In the upstream direction, following phase 43 the channel discovery in the upstream direction denoted with reference numeral 44 and labeled R-P-Channel Discovery 1 is performed, which may correspond to the conventional channel discovery. In the special operation channel, at this point also messages may be transmitted, of which in FIG. 3 as an example an idle message is shown at 55 and a message comprising actual content is shown at 46.

It should be noted that the embodiment shown in FIG. 3 merely represents one possibility for implementing the first vector training, and in other embodiments of the implementation is meant to be used. For example, in a different embodiment the O-P-Sync Vec signal labeled 34 in FIG. 3 may be transmitted via a special operation channel. In a different embodiment, such a Sync Vec signal may be transmitted only after the complete channel discovery in the downstream direction, i.e. after phases 33 and 35. Still other embodiments are adapted to communication standards other than VDSL.

Furthermore, it is to be noted that the features of the embodiments of FIG. 3, for example the order of downstream and upstream vectoring training, may also be used independent of the embodiment shown in FIG. 2.

Furthermore, in an embodiment the special operations channel may be modified compared to the VDSL2 standard. For example, according to the VDSL2 standard, in the special operations channel every tenth carrier carries the same information (for example carriers 11, 21, 31, . . . carry the same information bits). In an embodiment of the present invention, during the first vector training, the special operations channel is modified for example higher modulations, for example 16-QAM, 64-QAM, i.e. quadrature amplitude modulation with 16 possible constellations or 64 possible constellations. In another embodiment, additionally or alternatively the repetition rate in the frequency domain of the channels is reduced compared to conventional VDSL2 transmission, for example by repeating only every $15^{th}$ carrier, every $20^{th}$ carrier or every $50^{th}$ carrier.

In a further embodiment, this increase of bandwidth for the back channel may also be performed only for the direction from the customer premises to the central office.

In another embodiment, this variation of the bandwidth of the backchannel is configured to be variable. For example, the bandwidth of the special operation channel for the corresponding phase could be configured with messages during the training phase or during any other phase or point in time pre-ceding the phase where the bandwidth increase is needed. For example, specific parameters or specific messages could be sent via the special operations channel, for example by modifying the so-called "O-TA_Update" message. In an embodiment, this bandwidth increase is performed at a time where the final power spectral density and the initial signal to noise ratio estimates of the communication lines are available, based on which the central office in an embodiment calculates the bandwidth requirements and communicates to the customer premises the required parameters like constellation size or channel repetition mentioned above for the special operation channel.

As already mentioned, in the back channel HDLC may be used which for example may be formed for each used band.

Figure 7:
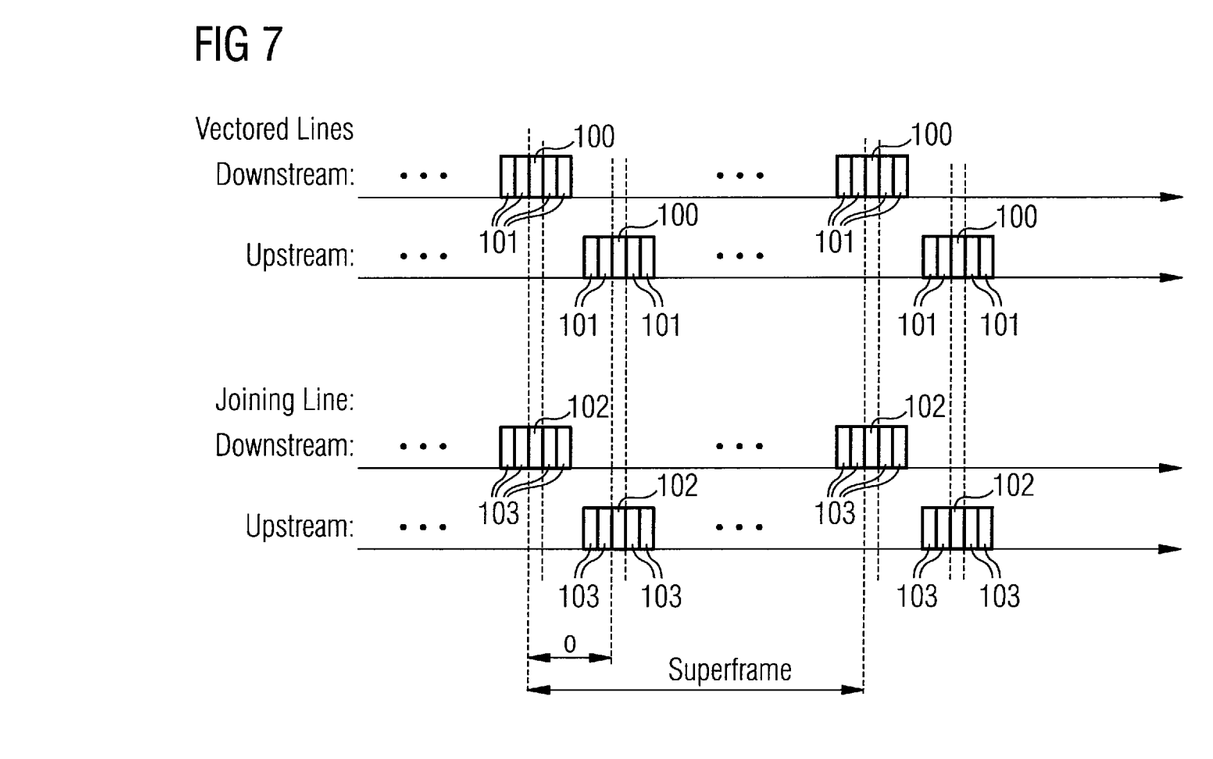

Next, an example for the second vector training of step 24 of the embodiment of FIG. 2 according to an embodiment of the present invention will be discussed with reference to FIG. 7. FIG. 7 schematically shows symbols transmitted via the vectored lines, i.e. the lines already in the vectored group, and the joining line. Similar to the embodiments of the first vector training discussed above, synchronization symbols at the beginning of each superframe of VDSL transmission are used to adapt the vectoring. On the vectored lines, synchronization symbols 100 are transmitted at the beginning of each superframe followed by other symbols 101 which for example may be payload data symbols. The synchronization symbols in the upstream direction are offset by an offset o from the synchronization symbols in the downstream direction.

On the joining line synchronization symbols 102 are transmitted at the positions of the synchronization symbols 100 in the already vectored lines. Also on the joining line, the synchronization symbols 102 in the upstream direction are offset by the offset o from the synchronization symbols 102 in the downstream direction. The offset o in an embodiment is communicated to the customer premises equipment of the joining line via the special operation channel, for example by O-Signature message 38 of the embodiment of FIG. 3 as already discussed. Between the synchronization symbols 102, other symbols 103 are transmitted which may be any kind of symbols, for example symbols for training the joining line, data symbols, quiet symbols or pilot symbols. While only signals for one vectored line are shown in FIG. 7, synchronization symbols 100 are transmitted on all vectored lines synchronously.

As has already been explained above, the synchronization symbols 100, 102 on each of the lines are modulated by orthogonal or almost orthogonal sequences in an embodiment, for example Walsh-Hadamard sequences. The sequence to be used on the joining line in an embodiment is also communicated to the corresponding customer premises equipment via the special operations channel, for example O-Signature message 38 of the embodiment of FIG. 3. Based on the synchronization symbols, similar to what has been discussed with reference to FIGS. 4 and 5 the vectoring, i.e. crosstalk precompensation and crosstalk cancellation, are adjusted to reduce the effect of crosstalk from the vectored lines to the joining line. In this case, error signals generated by the respective receivers in upstream direction and downstream direction of the joining line are used. While in an embodiment in the second vector training only the crosstalk from the vectored lines to the joining line may be reduced, in a different embodiment the overall crosstalk may be reduced by taking all error signals, i.e. error signals both from the vectored lines and the joining line, into account. In such an embodiment, for example changes in the crosstalk from the joining line to the vectored lines caused by changes in the communication between the first vector training and the second vector training, for example caused by adjustment during the channel discovery 22 and the training 23 of the embodiment of FIG. 2, may be taken into account.

The above-described embodiments are only to be seen as examples for practicing the present invention, and modifications and other embodiments using the same or similar principles are apparent to a person skilled in the art. As already mentioned, while VDSL2 transmission has been taken as a specific example for data transmission, the principles set forth herein may be applied to other kinds of communication including wireless communication. Moreover, while both upstream and downstream direction have been discussed, the principles set forth herein may be applied also on unidirectional communication systems. Therefore, the above-described embodiments are not to be construed as limiting the scope of the present application, and the scope is intended to be limited only by the following claims and equivalents thereof.

What is claimed is:

1. A communication device, comprising:
    transceiver circuitry operable to communicate with another communication device over a vectored group of communication connections; and
    a crosstalk reduction unit operable to:
        reduce crosstalk between the communication connections in the vectored group by vectoring;
        performing a first vectoring to reduce crosstalk resulting from the influence of a joining communication connection to be added to the vectored group on the communication connections already in the vectored group by analyzing the communication connections in the vectored group without regard to crosstalk resulting from the influence of the communication connections already in the vectored group on the joining communication connection; and
        performing a second vectoring after at least part of an initialization phase of the joining communication connection performed after said first vectoring to reduce crosstalk resulting from the influence of the communication connections already in the vectored group on the joining communication connection.

2. The communication device according to claim 1, wherein the initialization phase comprises a channel discovery phase.

3. The communication device according to claim 2, wherein the crosstalk reduction unit is further operable to perform the second vectoring after at least part of the initialization phase to reduce crosstalk resulting from the influence of the joining communication connection on the communication connections already in the vectored group so that modifications to data transmissions on the joining communication connection performed during the at least part of the initialization phase are accounted for the second vectoring.

4. The communication device according to claim 2, wherein the transceiver circuitry is operable to transmit modulated synchronization symbols used for said first vectoring over the joining communication connection in synchronization with signals transmitted over the communication connections already in the vectored group so that data transmissions on the communication connections already in the vectored group occur in time slots between the modulated synchronization symbols.

5. The communication device according to claim 4, wherein after the first vectoring to reduce crosstalk resulting from the influence of the joining communication connection on the communication connections already in the vectored group, the transceiver circuitry is operable to transmit further training symbols over the communication connections already in the vectored group to the other communication device for recovering timing of the modulated synchronization symbols at the other communication device.

6. The communication device according to claim 5, wherein the transceiver circuitry is operable to receive synchronization symbols on the communication connections already in the vectored group from the other communication device after the other communication device recovers the timing of the modulated synchronization symbols, and wherein the crosstalk reduction unit is operable to perform the second vectoring after the at least partial initialization of the joining communication connection based on the synchronization symbols received from the other communication device.

7. The communication device according to claim 2, wherein the transceiver circuitry is operable to receive an error signal via backchannels in the communication connections already in the vectored group, the error signal indicating a difference between the modulated synchronization symbols transmitted to the other communication device and corresponding symbols actually received at the other communication device, and wherein the crosstalk reduction unit is operable to reduce crosstalk resulting from the influence of the joining communication connection on the communication connections already in the vectored group by reducing the error.

8. The communication device according to claim 2, wherein the transceiver circuitry is operable to transmit quiet signals between the modulated synchronization symbols on the joining communication connection during the first vectoring.

9. The communication device according to claim 1, wherein the crosstalk reduction unit is operable to begin the first vectoring to reduce crosstalk resulting from the influence of the joining communication connection on the communication connections already in the vectored group in a downstream direction before beginning the second vectoring to reduce crosstalk resulting from the influence of the joining communication connection on the communication connections already in the vectored group in an upstream direction.

10. The communication device according to claim 1, wherein the crosstalk reduction unit is operable to determine crosstalk reduction coefficients which reduce crosstalk between the communication connections in the vectored group, perform the first vectoring by changing the crosstalk reduction coefficients resulting from the influence of the joining communication connection on the communication connections already in the vectored group based on orthogonal non-payload data carrying signals of nominal power, and perform the second vectoring by changing the crosstalk reduction coefficients after the at least partial initialization of the joining communication connection to reduce crosstalk resulting from the influence of the communication connections already in the vectored group on the joining communication connection.

11. The communication device according to claim 1, wherein the communication device is a VDSL communication device and the communication connections are VDSL communication lines, and wherein a first part of an initialization of the joining communication connection is performed between the t first vectoring to reduce crosstalk resulting from the influence of the joining communication connection on the communication connections already in the vectored group and the second vectoring to reduce crosstalk resulting from the influence of the communication connections already in the vectored group on the joining communication connection, and wherein a second part of the initialization of the joining communication connection is performed after the second vectoring to reduce crosstalk resulting from the influence of the communication connections already in the vectored group on the joining communication connection.

12. The communication device according to claim 1, wherein the communication device is a VDSL communication device and the communication connections are VDSL communication lines, and wherein the joining communication connection is completely initialized between the first vectoring to reduce crosstalk resulting from the influence of the joining communication connection on the communication connections already in the vectored group and the second vectoring to reduce crosstalk resulting from the influence of the communication connections already in the vectored group on the joining communication connection.

13. The communication device according to claim 1, wherein the transceiver circuitry is operable to transmit a signature message containing transmission parameters to the other communication device, and wherein the crosstalk reduction unit is operable to provide additional information in the signature message relating to the vectoring.

14. The communication device according to claim 13, wherein the additional information indicates an amount by synchronization symbols transmitted in an upstream direction by the other communication are offset from synchronization symbols transmitted in a downstream direction by the communication device.

15. The communication device according to claim 13, wherein the additional information indicates a modulation sequence for synchronization symbols to be used by the joining communication line.

16. A method of operating a communication device, comprising:
communicating with another communication device over a vectored group of communication connections;
reducing crosstalk between the communication connections in the vectored group by vectoring;
performing a first vectoring to reduce crosstalk resulting from the influence of a joining communication connection to be added to the vectored group on the communication connections already in the vectored group, without regard to crosstalk resulting from the influence of the communication connections already in the vectored group on the joining communication connection; and
performing a second vectoring after at least part of an initialization phase of the joining communication connection performed after said first vectoring to reduce crosstalk resulting from the influence of the communication connections already in the vectored group on the joining communication connection.

17. The method according to claim 16, wherein the initialization phase comprises a channel discovery phase.

18. The method according to claim 17, further comprising performing the second vectoring after at least part of the initialization phase to reduce crosstalk resulting from the influence of the joining communication connection on the communication connections already in the vectored group so that changes to data transmissions on the joining communication connection performed during the at least part of the initialization phase are accounted for when performing the second vectoring.

19. The method according to claim 18, wherein after the first vectoring is performed to reduce crosstalk resulting from the influence of the joining communication connection on the communication connections already in the vectored group, transmitting further training symbols over the communication connections already in the vectored group to the other communication device for recovering timing of the modulated synchronization symbols at the other communication device.

20. The method according to claim 19, further comprising receiving synchronization symbols on the communication connections already in the vectored group from the other communication device after the other communication device recovers the timing of the modulated synchronization symbols, and wherein the second vectoring is performed after the at least partial initialization of the joining communication connection based on the synchronization symbols received from the other communication device.

21. The method according to claim 17, further comprising receiving an error signal via backchannels in the communication connections already in the vectored group, the error signal indicating a difference between the modulated synchronization symbols transmitted to the other communication device and corresponding symbols actually received at the other communication device, and wherein crosstalk resulting from the influence of the joining communication connection on the communication connections already in the vectored group is reduced by reducing the error.

22. The method according to claim 17, further comprising transmitting quiet signals between the modulated synchronization symbols on the joining communication connection during the first vectoring.

23. The method according to claim 16, wherein the first vectoring to reduce crosstalk resulting from the influence of the joining communication connection on the communication connections already in the vectored group in a downstream direction begins before beginning the second vectoring to reduce crosstalk resulting from the influence of the joining communication connection on the communication connections already in the vectored group in an upstream direction.

24. The method according to claim 16, further comprising:
determining crosstalk reduction coefficients which reduce crosstalk between the communication connections in the vectored group;
performing the first vectoring by changing the crosstalk reduction coefficients resulting from the influence of the joining communication connection on the communication connections already in the vectored group based on orthogonal non-payload data carrying signals of nominal power; and
performing the second vectoring by changing the crosstalk reduction coefficients after the at least partial initialization of the joining communication connection to reduce crosstalk resulting from the influence of the communication connections already in the vectored group on the joining communication connection.

25. The method according to claim 16, further comprising:
transmitting a signature message containing transmission parameters to the other communication device; and
providing additional information in the signature message relating to the vectoring.

26. The method according to claim 25, wherein the additional information indicates an amount by synchronization symbols transmitted in an upstream direction by the other communication are offset from synchronization symbols transmitted in a downstream direction by the communication device.

27. The method according to claim 25, wherein the additional information indicates a modulation sequence for synchronization symbols to be used by the joining communication line.

* * * * *